United States Patent [19]
Henderson et al.

[11] Patent Number: 5,237,331
[45] Date of Patent: Aug. 17, 1993

[54] EYESAFE COHERENT LASER RADAR FOR VELOCITY AND POSITION MEASUREMENTS

[76] Inventors: Sammy W. Henderson, 7770 Durham Way, Boulder, Colo. 80301; Charley P. Hale, 123 Mineola, Boulder, Colo. 80303; R. Milton Huffaker, 229 Mountain Meadows Rd.; James R. Magee, 1821 22nd St., #102, both of Boulder, Colo. 80302; Michael J. Kavaya, 113 Dunhill Dr., Huntsville, Ala. 35824; Paul J. M. Suni, 8513 N. 95th, Longmont, Colo. 80503-7716

[21] Appl. No.: 880,514

[22] Filed: May 8, 1992

[51] Int. Cl.[5] .................. G01S 7/48; G01S 13/95; G01N 21/85
[52] U.S. Cl. ........................... 342/54; 356/5; 356/28; 342/26; 342/460
[58] Field of Search ............. 342/54, 26, 460; 356/5, 356/28, 28.5

[56] References Cited

U.S. PATENT DOCUMENTS

| | | | |
|---|---|---|---|
| 3,532,427 | 10/1970 | Paine | 356/28 |
| 3,856,402 | 12/1974 | Low et al. | 356/5 |
| 3,984,685 | 10/1976 | Fletcher et al. | 250/339 |
| 4,902,127 | 2/1990 | Byer et al. | 356/5 |
| 4,914,663 | 4/1990 | Basu et al. | 372/18 |
| 4,918,704 | 4/1990 | Caprara et al. | 372/99 |
| 4,955,725 | 9/1990 | Johnson et al. | 372/22 |
| 5,081,630 | 1/1992 | Lowenthal et al. | 372/20 |

*Primary Examiner*—John B. Sotomayor

[57] ABSTRACT

A coherent laser radar system operating at an eyesafe wavelength above 1.4 microns has been provided for measurement of the position and velocity of hard targets and aerosol targets, said system comprising a frequency-stable master laser and an injection-seeded Q-switched slave laser for generating signals for transmission to the target. Means for obtaining highly accurate velocity and range measurements are provided. Data from signal transmissions and receptions taken over a range of angles are analyzed to map target positions and velocities in time and space.

3 Claims, 6 Drawing Sheets

EYESAFE COHERENT LASER RADAR FOR VELOCITY AND POSITION MEASUREMENTS

ORIGIN OF THE INVENTION

The invention described herein was made in the performance of work under a contract with the U.S. Government and the Government has certain rights therein.

FIELD OF THE INVENTION

This invention is a laser radar system for measuring the velocity and position of targets including atmospheric aerosol particles. Eyesafe wavelengths above 1.4 microns are used.

BACKGROUND OF THE INVENTION

Laser radar systems have numerous uses in military and civilian remote sensing applications. Both direct (incoherent) and heterodyne (coherent) detection laser-radar measurements are possible. Incoherent detection acts as a "photon bucket," collecting the received photons, and is insensitive to their phase. Coherent detection optically mixes the received light field with a local oscillator field on the surface of a detector and is sensitive to the relative phases, or frequencies, of the two fields, as well as the intensity of the received light field. By employing shot-noise-limited heterodyne detection, coherent laser radar systems also have the advantage of greater sensitivity, especially when using infrared laser wavelengths. Wavelengths above 1.4 microns are more eyesafe than shorter wavelengths, and laser radar systems using such sources are hence of particular interest. By comparing the frequency of radiation which is scattered back toward the laser radar system to that of the transmitted pulse, the frequency change due to the relative motion of the scatter, with respect to the laser radar system (Doppler shift), can be computed and used to measure the component of the velocity along the line-of-sight (radial velocity). Measuring the radial velocity along 3 or more lines-of-sight allows computation of the velocity vector. Small aerosol particles which are entrained in the atmosphere move with the wind and serve as distributed scatters, allowing the remote measurement of aerosol concentrations and wind velocity using a coherent laser radar system to measure the intensity and frequency of the scattered laser light.

Coherent laser radar systems have been developed and demonstrated. U.S. Pat. No. 3,532,427 to Paine et al., describes a laser radar system for measuring fluid flow velocity. U.S. Pat. No. 3,856,402 to Low et al. describes a clear air turbulence detector utilizing a carbon dioxide coherent laser radar system. U.S. Pat. No. 3,984,685 to Fletcher et al. describes a laser radar wind measurement system using a carbon dioxide laser radar system. The majority of coherent laser radar remote sensing performed to date has utilized carbon dioxide gas laser technology at eyesafe wavelengths of 9-11 microns, however these carbon dioxide systems have several disadvantages that limit their practical use, such as cryogenically cooled radiation detectors, large size, and because of the long wavelength used, poor spatial resolution and low backscatter from atmospheric aerosol particles.

Laser radars utilizing shorter wavelengths, such as solid-state coherent laser radars operating at 1.06 microns using a Nd:YAG system, have also been demonstrated [see T. J. Kane et al., Opt. Lett. 12:239-241 (1987) and M. J. Kavaya et al., Opt. Lett. 14:776-778 (1989)]. This type of system uses a master-oscillator power-amplifier (MOPA) configuration in which a low power, narrow bandwidth laser beam is amplified by many orders of magnitude in a very high-gain multiple-pass amplifier. U.S. Pat. No. 4,902,127 to Byer and Kane describes such a 1.06 $\mu$m Nd:YAG MOPA coherent laser radar system, and broadly describes the use of numerous solid-state lasers in coherent laser radar systems. Nd:YAG operating at 1.06 $\mu$m, while not eyesafe, provides a very high emission cross-section which permits construction of highly efficient, high-gain laser amplifiers. A serious drawback with previously-known shorter wavelength laser radar systems, such as Nd:YAG-based systems, is that the emission wavelength of 1.06 microns is, according to the present American National Safety Institute (ANSI) standards, significantly more dangerous to the eye than wavelengths longer than 1.4 microns. Several laser ions emit at wavelengths longer than 1.4 microns, but they typically have much smaller emission cross-sections, which makes implementation of a MOPA coherent laser radar system difficult, if not impossible, due to the required high optical gain.

An alternative technique for a coherent laser radar is to use an injection-seeded oscillator to produce frequency-stable high-power optical pulses. However, such injection-seeded oscillators do not inherently possess the temporal or frequency stability needed for highly accurate range and velocity measurements. U.S. Pat. No. 4,902,127 suggests the use of injection-seeded oscillators in eyesafe laser radar systems, but does not contain a teaching of a device configuration or any methods or components which would enable sufficient temporal or frequency stability to allow the use of injection-seeded oscillators in coherent laser radar applications requiring highly accurate range and velocity measurements.

SUMMARY OF THE INVENTION

An eyesafe coherent laser radar system has been provided for the accurate measurement of the velocity and position of hard targets and aerosol targets. The system utilizes a frequency-stable solid-state laser and an injection-seeded Q-switched solid-state laser, referred to herein as the master oscillator and slave oscillator, respectively, to produce a laser signal for transmission to a target.

The master oscillator is a solid-state laser which operates in the eyesafe wavelength region beyond 1.4 $\mu$m and exhibits good frequency stability. The laser emission from the master oscillator serves as the frequency standard in the coherent laser radar measurement process and is used to seed the slave oscillator. A fraction of the master oscillator emission is injected into the Q-switched slave oscillator, which generates a spectrally-pure output pulse at a frequency close, but not identical to that of the injected radiation. The majority of the slave oscillator emission is transmitted to the target through a transmitting means, preferably an off-axis telescope, in order to minimize scattering of transmitted radiation back into the system. Radiation scattered from a hard target or aerosol target moving relative to the laser radar platform is Doppler shifted and collected through a receiving means, preferably with the same telescope used for transmission. The collected radiation is then detected through a detecting means, preferably by coherently mixing the collected radiation with a portion of the master oscillator radiation on a photosensitive signal detector. The electrical output from the signal detector can be utilized to extract target backscatter, range, and velocity information. In cases where the laser radar platform is moving, such as on an aircraft, for example, the signal detector output can also be utilized to extract aircraft velocity information.

Because of the physics of the injection-seeding process, an injection-seeded Q-switched oscillator typically exhibits temporal and frequency jitter. Left uncorrected, this jitter leads to errors in the measurement of range and velocity, respectively. Means for correction of this jitter can also be provided. In the preferred embodiment this is achieved by coherently mixing a small fraction of the slave oscillator emission with a second portion of the master oscillator emission on a photo-sensitive reference detector. The electrical output from the reference detector is utilized to measure the frequency difference between the master and slave oscillators and the transmit time of the slave oscillator pulse on a shot-to-shot basis. This allows accurate measurements of the target velocity and range.

Means for preventing backscattered radiation from components of the coherent laser radar system from re-entering the master oscillator, e.g., a yttrium iron garnet or bizmuth iron garnet Faraday isolator, positioned between the master oscillator and the components, can also be provided.

Means for determining the direction of velocity of the target can also be provided comprising a frequency shifting means positioned between the master oscillator and the slave oscillator. Said frequency shifting means is utilized to change the frequency of laser signals emitted from the master oscillator for input into the slave oscillator by an amount from zero to greater than the amount of the Doppler shift of the laser signals returned from the target.

The master oscillator of the preferred embodiment of this invention can be a semiconductor diode-pumped solid-state laser medium operating in the eyesafe wavelength range to generate spectrally narrow, frequency-stable continuous-wave laser radiation. This component serves to provide both the reference frequency and the injection-seeding signal to the pulsed Q-switched slave oscillator.

The laser gain medium can be any medium providing wavelengths in the eyesafe wavelength range above 1.4 $\mu$m. As is well-known in the art, a host material co-doped with certain combinations of absorber ions and lasing ions, produces wavelengths in the eyesafe range. The master oscillator of the preferred embodiment can utilize a solid-state laser gain medium doped with Tm or Ho ions, or a solid-state laser gain medium doped with both Tm and Ho ions.

The slave oscillator may be optically pumped by flashlamps or by semiconductor diode lasers. In cases where diode laser pumping is utilized, the solid-state laser gain medium comprises the group listed above. If flashlamp pumping is utilized, the above listed materials may also be co-doped with other absorber ions, such as Cr or Er ions, for example.

This invention can also provide for mapping the positions of targets (such as several hard targets or an air mass) in time and space by comparing the data received from a series of coherent laser radar transmissions and receptions taken over a range of angles. Such coordinated transmissions and receptions can be generated by means of a movable-mirror or other optical scanner.

BRIEF DESCRIPTION OF THE DRAWINGS

FIG. 2b shows the spectral content of the pulse which is a result of performing a Discrete Fourier Transform (DFT) analysis of the temporal data contained in FIG. 2a.

DESCRIPTION OF THE PREFERRED EMBODIMENTS

Figure 1:
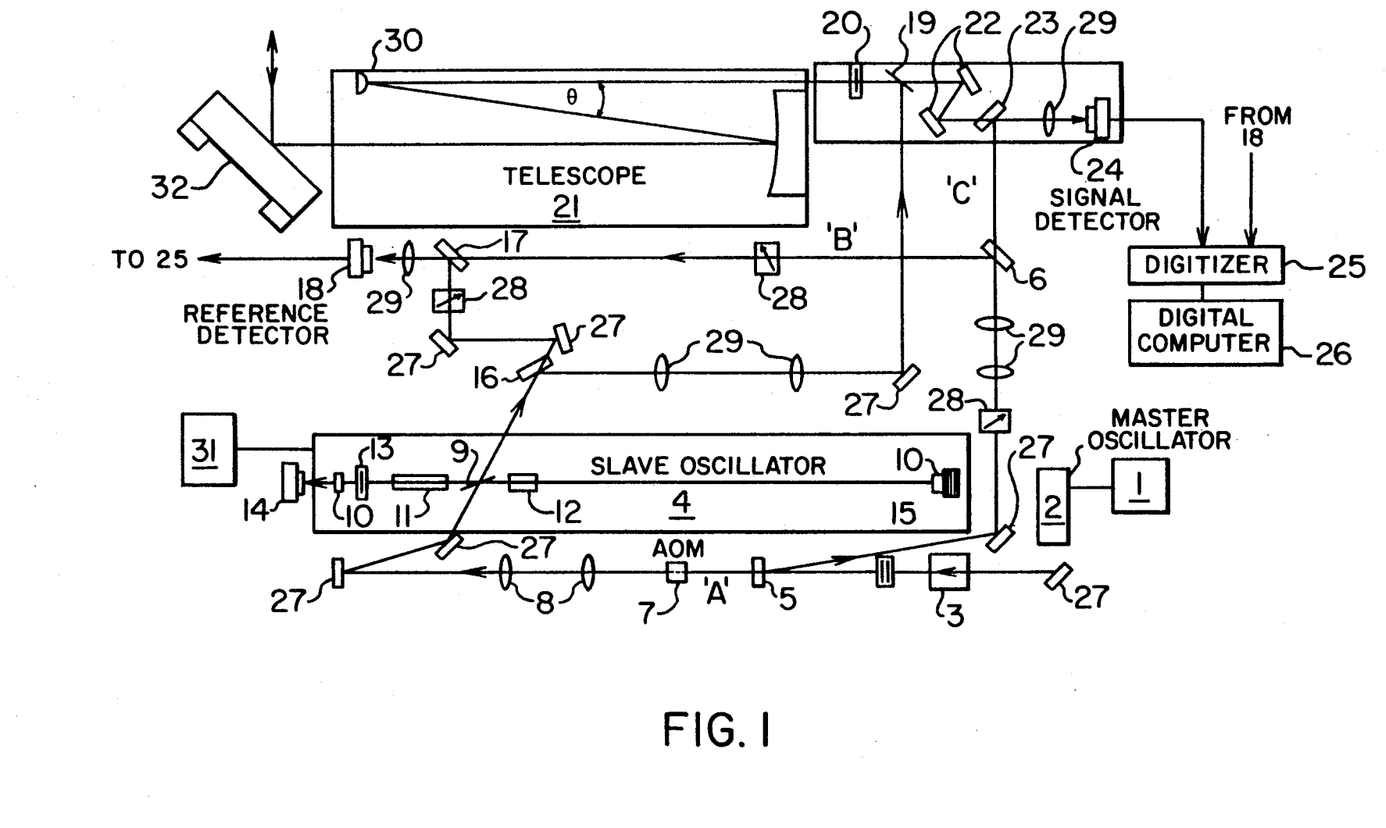
FIG. 1 is a schematic line diagram, partly in block diagram form, of an eye-safe coherent laser radar system incorporating features of the present invention.

Referring to FIG. 1, there is shown a coherent laser radar system. A semiconductor diode laser 1 is used to optically pump a solid-state laser 2, such as the one described by Henderson and Hale, Appl. Opt. 29:1716-1718 (1990), incorporated herein by reference. This CW laser, referred to herein as the master oscillator, is a single-longitudinal-mode solid-state laser such as Tm,Ho:YAG, for example, that exhibits a short-term frequency stability of less than 100 kHz/msec and produces >10 mW of power in the eyesafe wavelength region beyond 1.4 $\mu$m. In one embodiment, the laser utilizes a linear cavity with an intracavity Brewster plate for polarization control and intracavity etalons for frequency control. The etalons allow tuning of the laser over wide frequency intervals. In another embodiment, an eyesafe solid-state laser utilizing a monolithic geometry such as described by Kane and Byer, Opt. Lett. 10:65-67 (1985) or Zayhowski and Mooradian, Opt. Lett. 14:24-26 (1989), for example, is utilized.

An optical Faraday isolator 3 prevents radiation backscattered from the slave oscillator 4 or other system components from re-entering the master oscillator, thereby potentially causing its frequency or amplitude to fluctuate. Preferably a permanent-magnet yttrium iron garnet or bismuth iron garnet Faraday isolator is used but other materials are also possible. Beamsplitters 5 and 6 are used to split the master oscillator output into three portions, the "seed" radiation A, the "reference" radiation B, and the "local oscillator" radiation C. Beamsplitter 5 also provides additional isolation of the master oscillator from the slave oscillator.

Following beamsplitter 5 is an acousto-optic modulator (AOM) 7, which shifts the frequency of the seed radiation by an amount $f_o$. Preferably the AOM is a chalcogenide glass AOM which exhibits high diffraction efficiency, but other materials are also possible. As described below, the frequency shift introduced by the AOM allows the unambiguous resolution of positive and negative target velocities. In cases where target velocities of only one sign, either positive or negative, are encountered, the AOM may be removed from the system. Lens pair 8 is used to match the seed radiation to the transverse mode of the slave oscillator 4.

After being frequency shifted and mode matched, the seed radiation A is injected into the Q-switched solid-state slave oscillator using intracavity polarizer 9. In alternate embodiments, the frequency-shifted seed radiation is injected through one of the slave oscillator end mirrors 10 or by reflection or refraction from other slave oscillator intracavity elements.

The slave oscillator contains a flashlamp-pumped solid-state laser rod 11 which operates in the eyesafe wavelength region beyond 1.4 μm. The laser cavity is Q-switched by means of polarizer 9 and Pockels cell 12. The Pockels cell is an electro-optic material such as $LiNbO_3$, for example. With an appropriate high voltage applied to the Pockels cell, the laser cavity loss is high enough that the laser does not oscillate. In other embodiments, an acousto-optic modulator may be used to Q-switch the slave oscillator.

Following optical pumping of the laser rod 11 by the flashlamps, the cavity loss introduced by the Q-switch is rapidly dropped to near zero. At this point the slave laser cavity begins to oscillate with random spontaneous emission radiation, as well as with the injected radiation. The intracavity radiation rapidly builds up in intensity as it traverses the laser cavity formed by end mirrors 10. If the intensity of the injected radiation is sufficiently high, and if its frequency is sufficiently near a longitudinal mode frequency of the slave oscillator, radiation at the longitudinal mode frequency which is nearest to that of the injected radiation grows to a high intensity faster than the random frequency noise at other longitudinal mode frequencies of the slave oscillator, saturating the gain and resulting in a single-longitudinal-mode output pulse.

Output coupling is obtained from the slave oscillator using intracavity quarter-wave optical retarder 13 and polarizer 9. In other embodiments, output coupling from the slave oscillator is obtained through a partially reflecting end mirror or by reflection or refraction from other slave oscillator intracavity components.

The frequency of a given single-longitudinal-mode pulse from the injection-seeded slave oscillator is not, in general, identical to that of the injected radiation. Rather it is at the longitudinal mode frequency of the slave oscillator which is nearest that of the injected radiation. The time required for the laser pulse to build up from the injected radiation after the Q-switch is opened depends on the gain of the slave oscillator and the difference between the frequency of the injected radiation and that of the nearest slave oscillator longitudinal mode. These properties of injection-seeded lasers are described by Tratt et al., Prog. Quant. Electr. 10:229-266 (1985) and Park et al., IEEE J. Quant. Electron., QE-20:117-125 (1984).

The near-frequency match between the slave oscillator and master oscillator required for single-longitudinal-mode output from the slave oscillator is maintained by methods such as that described by Rahn, Appl. Opt. 24:940 (1985), wherein an automatic servo system monitors the Q-switched build up time with detector 14 and adjusts the slave oscillator cavity length using end mirror 10 mounted on a piezoelectric translator 15. In other embodiments, different automatic servo techniques such as those described by: Kavaya and Menzies in U.S. Pat. No. 4,434,490; Henderson et al., Opt. Lett. 11:715-717 (1986); Drever et al., Appl. Phys. B 31:97-105 (1983); or Hansch and Couillaud, Opt. Comm. 35:441-444 (1980), for example, may be utilized to maintain the required near-frequency match.

In the preferred embodiment, the slave oscillator is optically pumped using semiconductor diode lasers rather than flashlamps. Diode lasers are more electrically efficient than flashlamps, generate less detrimental heat in the laser gain medium, and are more compact. Diode laser pumping of the slave oscillator is therefore advantageous, in coherent laser radar systems where electrical efficiency, thermal dissipation and/or compactness is important.

A small portion of the slave oscillator output is transmitted through beamsplitter 6, and coherently mixed with the reference radiation B using beamsplitter 17 on a photosensitive detector 18 (the reference detector). As described below, the output of this detector is used to measure the frequency difference between the master oscillator and the slave oscillator on a shot-to-shot basis which is needed for accurate velocity measurements. The reference detector also allows determination of the transmit time of the slave oscillator pulse, needed for accurate range measurements.

The majority of the slave oscillator output is reflected from beamsplitter 16 and polarizer 19 before passing through quarter-wave optical retarder 20, which changes the linear polarization state of the beam to a circular polarization state. The beam is then sent into the atmosphere through an off-axis telescope 21 and an optional steering mirror 22.

Radiation scattered in the backward direction from atmospheric aerosol particles, clouds, or hard targets, collectively referred to as targets, is returned to and collected with the same telescope 21. That fraction of the collected scattered radiation which is not depolarized by scattering from the target exits quarter-wave retarder 20 with a linear polarization state orthogonal to the transmitted one. As a result this radiation is transmitted through polarizer 19. Mirrors 22 and beamsplitter 23 are used to coherently combine the local oscillator radiation C from the master oscillator with the backscattered radiation on a photosensitive detector 24 (the signal detector). For optimum performance, the beam size and wavefront of the "backpropagated" local oscillator radiation is matched to that of the transmitted radiation as described by Frehlich and Kavaya, Appl. Opt., 30:5325-5352 (1991), and Rye and Frehlich, 6th Topical Meeting on Coherent Laser Radar: Technology and Applications, paper WA6. Also, the intensity of the local oscillator radiation incident on the signal detector is high enough that the local oscillator-generated shot noise dominates any other noise sources in the detector/amplifier circuit.

In other embodiments, the quarterwave retarder 20 may be removed, or an additional optical retarder may be added, in order to detect the depolarized component of the radiation scattered from the target, as described by Gross et al., Appl. Opt. 23:2518-2522 (1984).

The electrical signal from the reference detector 18 and the signal detector 24 are sampled and digitized with a high speed digitizer 25. A digital computer 26 is used to store digitized records of the sampled detector signals. The computer also processes the data from the detectors to extract range, backscatter, velocity, and velocity width information.

Other components which are important to operation of the coherent laser radar system are also shown in FIG. 1. High reflectivity mirrors 27 are used in many parts of the system to steer laser beams in appropriate directions. Attenuators 28 are used to attenuate laser beam intensities to such levels that the optical detectors are not saturated. Lenses 29 are used to control beam divergence and for mode matching so that efficient coherent mixing and detection occurs. In alternate embodiments, polarization-preserving single-mode optical fiber may be utilized to route the beams between various points in the system and fiber couplers may be utilized to coherently mix different beams replacing many of the lenses, mirrors, and beamsplitters in the system.

The preferred telescope used in this system has several features which make it suitable for the detection of signals at short ranges. A transmitted pulse of duration $\tau$ travels a distance $ct$ in a time $t$. The arrival of radiation scattered from a target at a range R from the coherent laser radar is determined by the time of flight $t$, $R = ct/2$. Optical signals returning from targets at ranges R less than $c\tau/2$ are then present on the signal detector at the same time as spurious signals due to transmitted light which is backscattered from components of the coherent laser radar system. In many measurement scenarios such backscatter can easily dominate the collected target backscatter or saturate the signal detector making short-range measurements impossible.

To minimize backscatter and hence improve the short-range performance of this coherent laser radar system, an off-axis telescope is used. Furthermore, it is found that much of the backscatter that interferes with the measurements can originate at the secondary telescope mirror 30. Such backscatter has in the present invention been minimized by using an off-axis telescope with a large off-axis angle $\theta$, a low-surface-roughness secondary mirror, and low scatter coatings.

In an alternative embodiment, two telescopes are used in place of the single telescope of the preferred embodiment. One telescope is used to transmit radiation and the other is used to receive scattered radiation. Such an arrangement further improves the detectability of targets at short ranges by effectively decoupling sources of undesirable backscatter in the transmit path from the receive path.

System control and signal processing is done as follows. Following a triggering signal from the slave oscillator controller electronics 31, the slave oscillator flashlamps are activated. After a fixed delay, when the stored energy in the laser rod 11 is maximized, the slave oscillator cavity loss introduced by the Q-switch is reduced to near zero. Following a small delay (cavity build-up time) the Q-switched laser pulse is produced by the slave oscillator. Upon "opening" the Q-switch or at a fixed delay before the laser pulse develops, a two-channel digitizer 25 is triggered to begin digitizing the electrical signals from the reference detector 18 and the signal detector 24.

The seed radiation A is shifted up $\bar{f}_o$ in frequency by the AOM prior to injecting the radiation into the slave oscillator (the upshift is arbitrary; a downshift is also possible). Although the mean frequency difference between the slave oscillator pulse and the master oscillator radiation is $\bar{f}_o$, technical noise and imperfect locking of the slave oscillator longitudinal mode frequency to that of the seed radiation, typically results in random shot-to-shot deviations of several MHz about the mean frequency difference. Unless corrected for, these frequency deviations cause errors in measurements of the radial velocity of the target.

The technical noise and imperfect locking described above, as well as fluctuations in the energy stored in the laser medium, also results in jitter in the pulse build-up time (the time required for the laser pulse to develop after the Q-switch is opened). Unless corrected for, this temporal jitter causes errors in the range measurements.

The jitter in the offset frequency is compensated for by utilizing the reference detector to characterize the frequency content of each outgoing pulse. Spectral processing (using Discrete Fourier Transform, DFT, techniques, for example) of the digitized reference detector data using the digital computer results in an accurate estimate of the true zero-offset frequency, $f_o$, for each shot. Coherent mixing of the backscattered light collected by the telescope and the local oscillator radiation C produces both sum and difference frequencies, but the sum frequency ($\sim 10^{14}$ Hz) is far above the bandwidth of the signal detector. Since the frequency of the master oscillator does not change significantly during the time of flight of the transmitted pulse to typical targets and back, the difference frequency is approximately $f_o$ for a nonmoving target. Targets moving toward the laser radar system will impart a positive Doppler shift of $f_D$ to the scattered light resulting in a difference frequency on the signal detector of $f_o + |f_D|$. Targets moving away from the lidar result in a difference frequency of $f_o - |f_D|$. Thus, there is no ambiguity in the direction of the target as long as $f_o$ is greater than the Doppler shifts $|f_D|$ of interest. With a sufficiently high frequency shift by the AOM $\bar{f}_o$, which is close to $f_o$, any ambiguity can be resolved.

Digitized records of varying lengths can be transferred to and stored by the digital computer 26. For the reference detector signal, relatively short record lengths are needed since the only requirement is that the outgoing pulse is captured. In most measurement scenarios, long digitized records are recorded from the signal detector 24. The exact record length needed for the signal detector data depends on the target ranges of interest.

By dividing the digitized signal detector data into bins (or range gates), each bin containing a record of N samples, according to its arrival time at the detector, range-resolved target information can be obtained. For accurate range-resolved measurements, the signal arrival time is measured with respect to the time the peak signal, due to the transmitted pulse, is detected by the reference detector. By referencing time to the peak of the transmitted pulse in this way, the detrimental effect of jitter in the pulse build up time, as described above, is removed.

The spectrum of the return signal at each range gate is calculated using spectral processing (see Doviak and Zrnic, *Doppler Radar and Weather Observations*, Academic Press, Orlando: 72, 107, 111 (1984), for example). The calculated spectrum at each range gate is then shifted by $-f_o$; where $f_o$ is the offset frequency between the transmitted pulse and the master oscillator output, measured using the reference detector data. The first two moments of the spectral distribution are then calculated. The first moment generates the mean Doppler frequency $f_D$ and the second moment indicates the width of the spectral distribution. The radial velocity of the target $V_t$ is then calculated using the relation $V_t = \lambda f_D / 2$. Note that $f_D$ and $V_t$ can be either positive or negative since the Doppler shift imparted to the transmitted radiation by the target can be positive or negative for targets moving toward or away from the laser radar, respectively. Shifting the spectrum by $-f_o$ as described above allows accurate velocity measurements, even though $f_o$ is fluctuating from shot-to-shot. Without such correction, fluctuations in $f_o$ of several MHz, which is typical for an injection-seeded transmitter, results in velocity errors of several meters per second. Such large velocity errors are unacceptable in many coherent laser radar applications.

To improve the signal-to-noise ratio, the shifted frequency spectra from two or more laser radar shots can be averaged before the mean velocity and velocity width is calculated. In alternate embodiments other spectral processing algorithms such as the pulse pair or poly pulse pair algorithms, for example, are utilized to determine the radial velocity of the target. The spectral processing algorithms can be implemented in electronic hardware as well as in software for a digital signal processor.

The coherent laser radar system described above can be attached to a mirror scanning device, which can be computer controlled to point the beam over a range of angles in space, away from the transmitter. By referencing each laser shot to a particular angle, or angles, in space and changing the angle between laser pulses, a volume of space can be scanned. This provides a method for searching a volume of space for one or more targets and mapping their positions in space and time. Repeated scans provide information on changes in target positions and/or radial velocities. In the case of distributed targets, such as atmospheric aerosols, such a scanning technique together with the coherent laser radar provides a three-dimensional map of radial wind velocities.

If the wavelength tuning range of the solid-state laser material utilized in the coherent laser radar system of this invention overlaps with absorption lines of molecules present in the atmosphere (either naturally occurring or otherwise), the coherent laser radar system can be utilized to measure the concentrations of such molecules by the differential absorption techniques such as described by Kavaya, et al., Appl. Opt. 28:840-851 (1989), for example.

EXAMPLES

The inventors have built and demonstrated an eyesafe injection-seeded solid-state coherent laser radar incorporating the features described above. The solid-state laser material used in this system is Tm,Ho:YAG which operates at eyesafe wavelengths near 2.1 μm. The 2.1 μm Tm,Ho:YAG coherent laser radar system is described in Henderson et al., Opt. Lett. 16:773-775 (1991); incorporated herein in its entirety by reference.

The development of this eyesafe solid-state coherent laser radar system also included several first-ever demonstrations (to the inventors' knowledge) of the critical component technology required for the present invention. These technology demonstrations include the demonstration of a frequency-stable single-longitudinal-mode continuous-wave solid-state laser operating at an eyesafe wavelength beyond 1.4 μm and the demonstration of an injection-seeded Q-switched solid-state laser operating at an eyesafe wavelength beyond 1.4 μm.

Several examples of the measurements made using this Tm,Ho:YAG coherent laser radar system are provided below. For all of the measurement examples, the wavelength, pulse energy, and pulse repetition frequency were set to 2090 nm, about 22 mJ, and 3.2 Hz respectively, resulting in a full-width half-maximum (FWHM) pulse duration of about 220 ns. The AOM operated at a frequency of 27 MHz in this system.

EXAMPLE 1

Figure 2A:
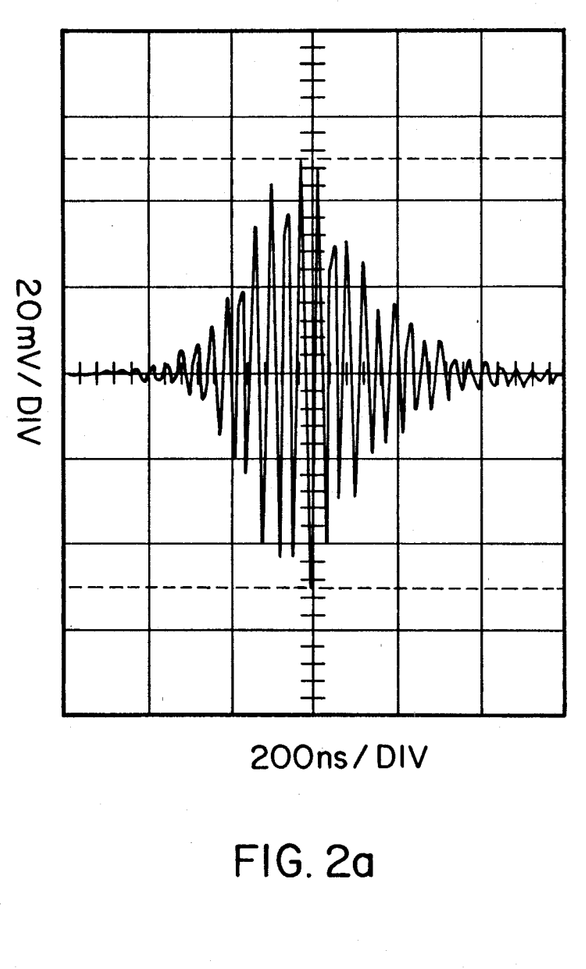
FIG. 2a shows an example of the output of the reference detector of this invention vs. time as captured by a digitizer.
Figure 2B:
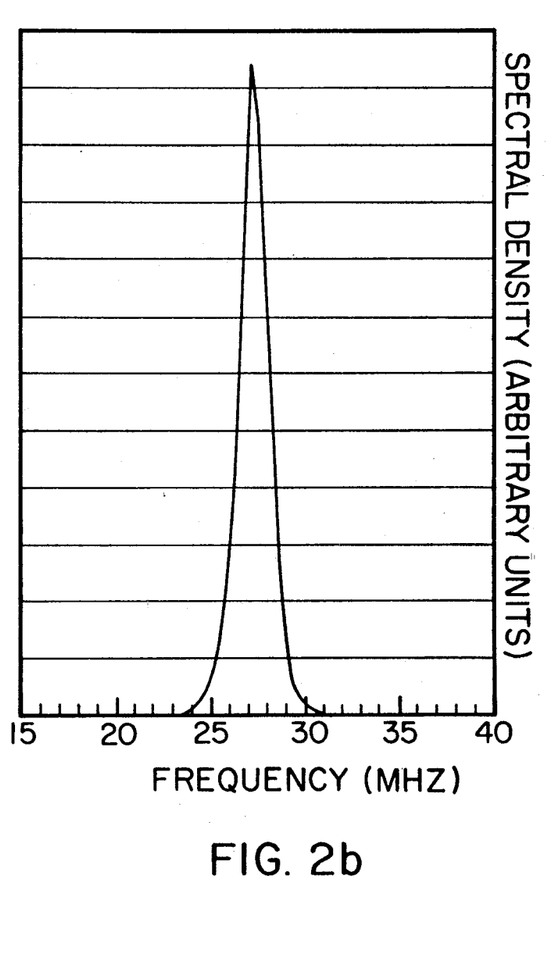

FIG. 2a shows an example of the output of the reference detector vs time as captured by the digitizer. Note the expected about 37 ns period (frequency about 27 MHz) of this signal due to beating between the frequency of the 220 ns FWHM slave oscillator pulse and the reference radiation 8. The spectral content of this pulse is shown with a linear ordinate in FIG. 2b. This sample spectrum was calculated using a 256-pt. Decrete Fourier transform (DFT) of the temporal data shown in FIG. 2a. Note that the FWHM of the spectrum is about 1.6 MHz, which may be broadened somewhat due to the DFT frequency resolution of $f_r=0.39$ MHz. This is computed from $f_r=(N_{DFT} \times T_S)^{-1}$ where $N_{DFT}=256$ points and the digitizer sample period $T_S=10$ ns.

EXAMPLE 2

Figure 3:
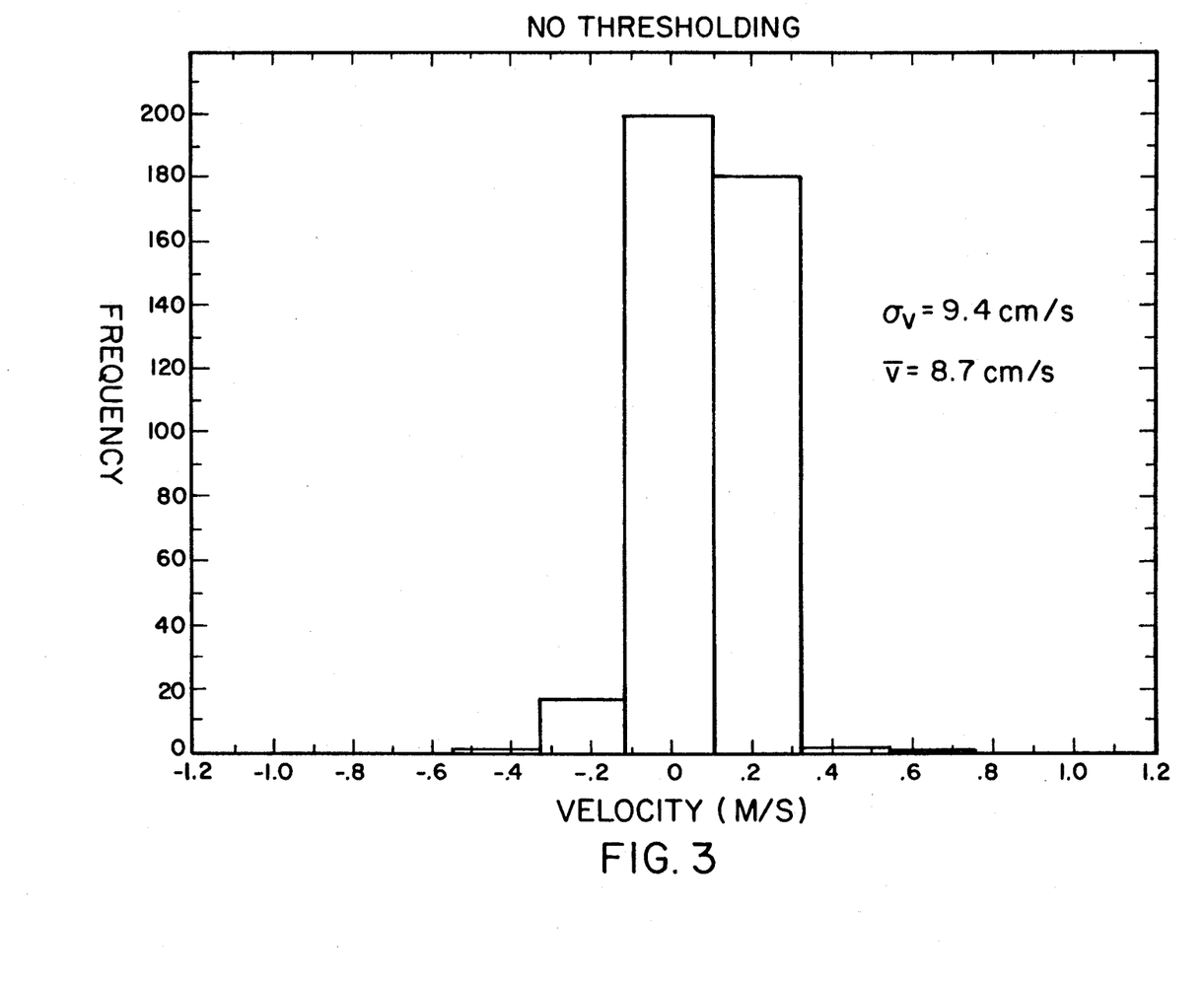
FIG. 3 shows the velocity measurement histogram obtained using the coherent laser radar system and method of this invention. The histogram results from 400 high signal-to-noise single-shot velocity measurements of a non-moving hard target located about 14 km from the coherent laser radar system.

In order to assess the velocity measurement accuracy of the entire coherent laser radar system, a number of single-shot velocity estimates of a nonmoving hard target (a hillside) located about 14 km from the coherent laser radar system were made. FIG. 3 shows the histogram resulting from 400 high-signal-to-noise single-hot measurements made at our remote field test site. A periodogram (i.e., a sample spectrum) is calculated for each individual return using a 128-point DFT. The first moment calculation, used for velocity estimation, was calculated after applying the zero-offset frequency correction, $f_o$, to the periodogram; it also employed only those corrected periodogram values with 5 MHz of the peak value (frequency thresholding) and above 20% of the peak value (amplitude thresholding). The mean value of the 400 velocity estimates was 8.7 cm/s and the standard deviation was 9.4 cm/s. Accurate velocity measurements can be made, even though the FWHM pulse duration is only 220 ns.

EXAMPLE 3

Figure 4:
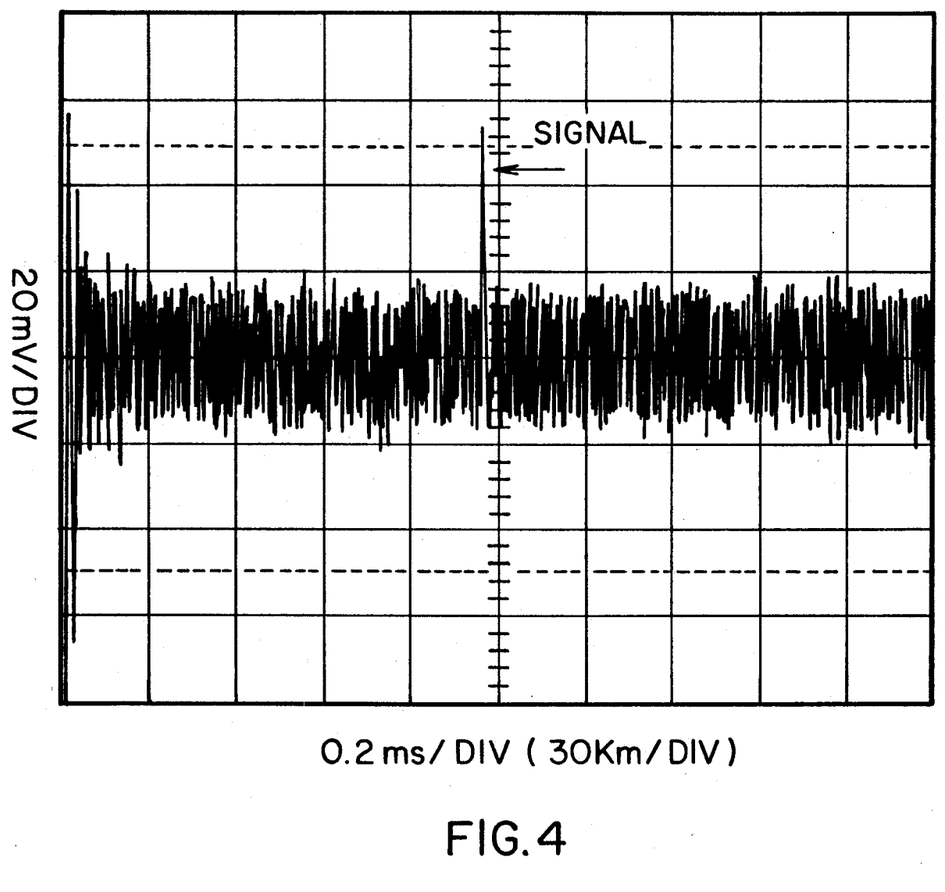
FIG. 4 shows a single-shot mountainside return obtained using the coherent laser radar system and method of this invention. The mountainside was located about 145 km from the coherent laser radar system.

FIG. 4 shows a single-shot return obtained from a mountainside (Pike's Peak) located about 145 km from the coherent laser radar system. When this measurement was made, the telescope was focused at infinity and the atmospheric refractive turbulence was low. The figure shows the intermediate frequency (IF) signal as digitized and displayed by the digitizer. The background fluctuation of ±20 mV seen across the figure is due to the local oscillator-generated shot noise. The large oscillations at the far left of the figure are due to backscatter from atmospheric aerosol particles, and the return from Pike's Peak is seen near the center of the figure. The negative-going portion of the IF signal return from Pike's Peak is not shown due to an artifact of the digitization (sample period $T_S=80$ ns) and display settings. This long-distance return indicates very high atmospheric transmission at $\lambda=2090$ nm.

EXAMPLE 4

Figure 5:
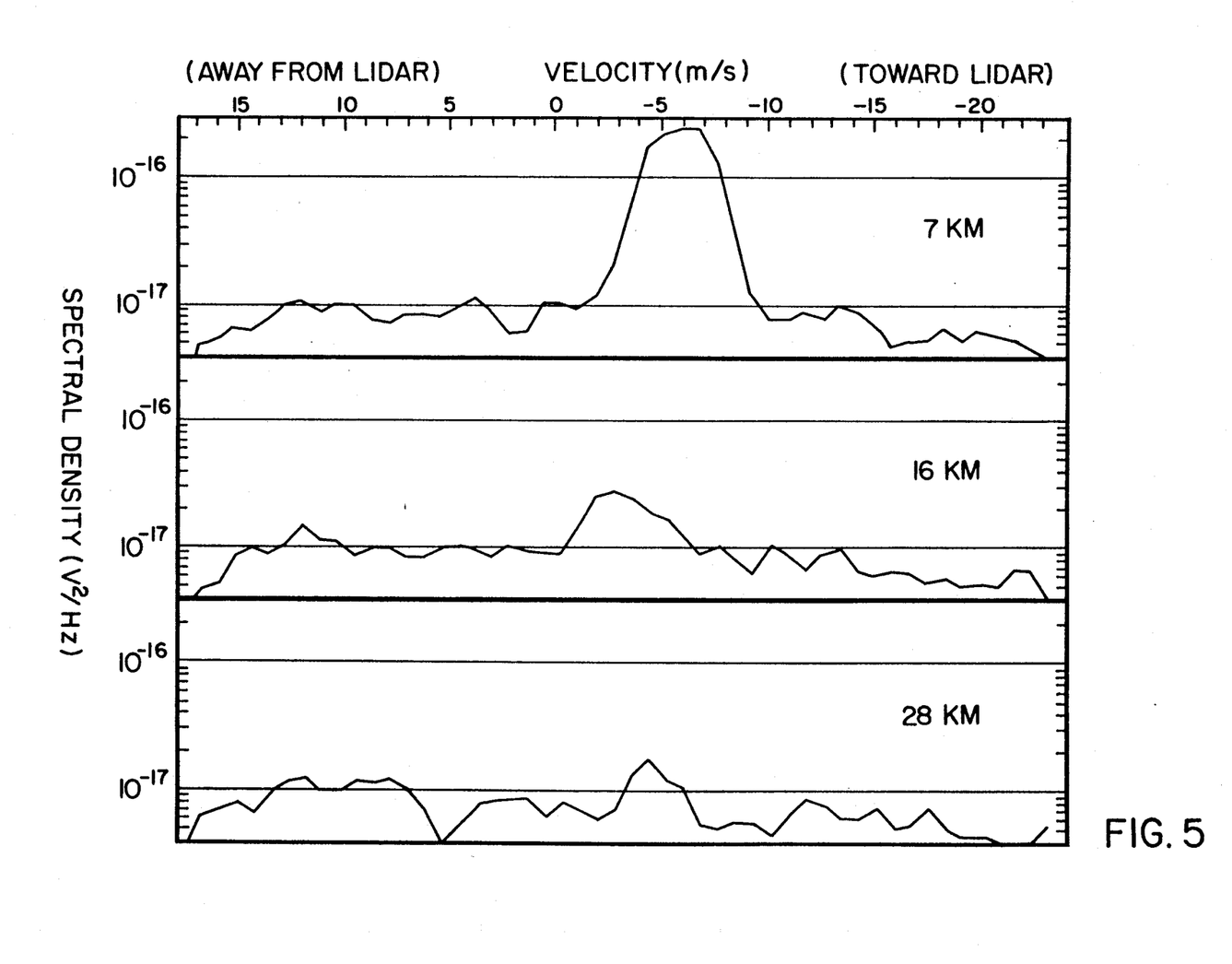
FIG. 5 shows representative averaged periodograms (power spectra) of atmospheric aerosol returns at ranges of 7, 16 and 28 km obtained using the coherent laser radar system and method of this invention.
Figure 6:
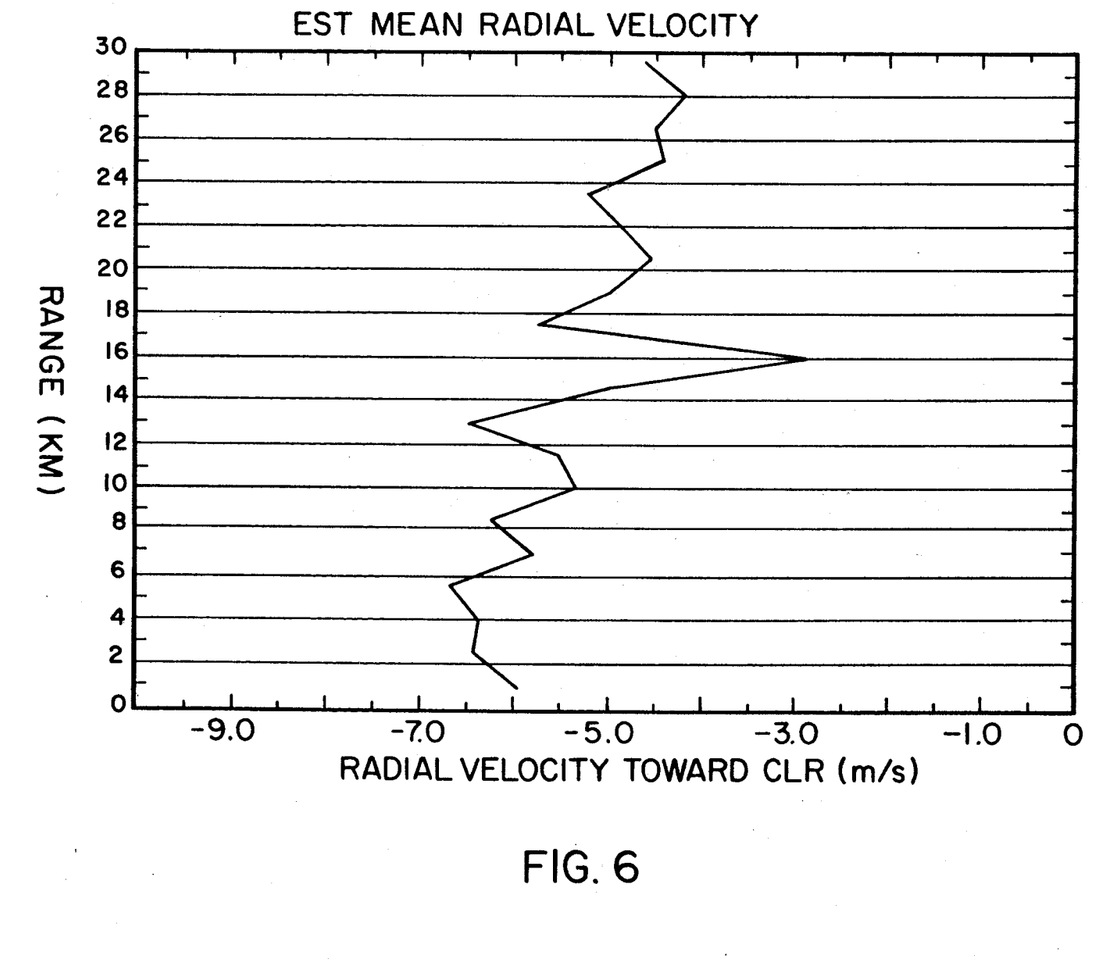
FIG. 6 shows estimated radial wind velocity vs. range measured using the coherent laser radar system and method of this invention.

FIGS. 5 and 6 show an example of an atmospheric wind measurement. For this measurement, the telescope was focused at infinity, the beam was aimed approximately north and about 40° C. from horizontal, and the digitizer sample period was 10 ns. Periodograms at 20 evenly-spaced range gates between 1 and 30 km were calculated from each of the single-shot IF records using 128-pt DFTs, and corrected using the measured master oscillator/slave oscillator-offset frequency, as determined using the reference detector data. Twenty single-shot periodograms were averaged for each range gate before performing the first moment (estimated velocity) calculation. FIG. 5 shows representative averaged periodograms at ranges of 7, 16, and 28 km with a logarithmic ordinate. FIG. 6 shows the estimated radial wind velocity vs range. The moment calculations at each range employed only those periodogram values within 4 MHz and above 10% of the peak value. Although the SNR drops substantially at the farther ranges, this 22-mJ 20-shot measurement produced continuous signals throughout the entire 30 km record. The feature near 16 km is believed to be due to a shear in the radial wind velocity near a hilltop located about 18 km down range. (The coherent laser radar transmitter beam passed within a few meters of the hilltop.)

We claim:

1. An eyesafe coherent laser radar comprising:
   (a) means for producing a laser signal with a wavelength greater than 1.4 microns for transmitting to a target, said means including a master oscillator and a slave oscillator, said slave oscillator comprising an injection-seeded, Q-switched, and solid-state oscillator seeded with a portion of the laser signal emitted from said master oscillator;
   (b) transmitter means for transmitting the laser signals emitted from said slave oscillator to a target;
   (c) receiving means for receiving the laser signal returned from said target;
   (d) detecting means for detecting the laser signals returned from said target.

2. A laser radar of claim 1 including a second detecting means for detecting the frequency difference between the laser signals emitted from said master oscillator and said slave oscillator and for detecting the transmit time for the slave oscillator pulse.

3. A laser radar of claim 2
   (a) comprising a means positioned between said master oscillator and other components of the coherent laser radar system for preventing backscattered radiation from said components from re-entering said master oscillator;
   (b) comprising a means for determining the direction of the velocity of said target, the said means comprise frequency shifting means positioned between said master oscillator and said slave oscillator for changing the frequency of laser signals emitted from said master oscillator and injecting into said slave oscillator by an amount which can be tuned from zero to greater than the amount of the Doppler shift of said laser signals returned from said target;
   (c) wherein said master oscillator comprises a laser gain medium selected from the group consisting of solid-state laser materials doped with Tm or Ho ions, or solid-state laser materials doped with both Tm and Ho ions;
   (d) wherein said slave oscillator comprises a laser gain medium selected from the materials listed above in (c), these materials may also be codoped with other absorber ions, such as Cr or Er ions, for example, where flashlamp pumping of the slave oscillator is utilized;
   (e) wherein said laser signal for transmission to said target has a wavelength of about 2 microns;
   (f) wherein said transmitter means comprises an off-axis telescope.

* * * * *